United States Patent [19]
Mizukami et al.

[11] 3,917,682
[45] Nov. 4, 1975

[54] PRODUCTION OF ACETIC ACID BY OXIDATION OF BUTENES

[75] Inventors: Tetsuo Mizukami; Takeshi Akahane; Yoshio Fuchigami, all of Kurashiki, Japan

[73] Assignee: Kuraray Co., Ltd., Tokyo, Japan

[22] Filed: May 21, 1970

[21] Appl. No.: 39,507

[30] Foreign Application Priority Data
June 2, 1969 Japan................................ 44-43158

[52] U.S. Cl............................ 260/533 R; 252/464
[51] Int. Cl.$^2$.................... C07C 53/08; C07C 51/32
[58] Field of Search................................ 260/533 R

[56] References Cited
UNITED STATES PATENTS
3,431,297  3/1969  Brockhaus...................... 260/533 R

*Primary Examiner*—Anton H. Sutto
*Assistant Examiner*—Richard D. Kelly
*Attorney, Agent, or Firm*—Kaufman & Kramer

[57] ABSTRACT

Acetic acid is produced in a high yield with good reproducibility by oxidizing butenes in the gas phase in the presence of a catalyst comprising vanadium oxide and titanium oxide, more than 50% of said titanium oxide being in a crystalline form of rutile.

11 Claims, No Drawings

PRODUCTION OF ACETIC ACID BY OXIDATION OF BUTENES tase: $2\theta=27.5°$ referring to rutile, and $2\theta=26.2°$ referring to vanadium.

$$\text{Rutile content (\%)} = \frac{\text{Intensity of diffraction at } 2\theta=27.5°}{(\text{Intensity of diffraction at } 2\theta=25.4°) + (\text{Intensity of diffraction at } 2\theta=27.5°)} \times 100$$

This invention relates to a process for the production of acetic acid by gas phase oxidation of butenes, and more particularly, to a process for producing acetic acid in high yield by using, in the oxidation, a catalyst comprising vanadium oxide and titanium oxide, major amount of said titanium oxide being in the rutile crystalline form.

It is known that acetic acid can be obtained by oxidizing butenes in gas phase in the presence of a catalyst comprising titanium vanadate, tin vanadate, antimony vanadate or aluminium vanadate. Among these catalysts, titanium vanadate is particularly preferred. Use of the titanium vanadate however does not always give acetic acid in a satisfactory yield. It has, therefore, been desired to find a process according to which, in the production of acetic acid from butenes, a high yield of acetic acid can be obtained with good reproducibility.

It has now been found that a high yield of acetic acid can be obtained by using, in the gas phase oxidation of butenes, a catalyst comprising vanadium oxide and titanium oxide in which more than 50% of said titanium oxide exists in the rutile crystalline form.

The catalyst comprising vanadium oxide and titanium oxide may be prepared by various methods. For example, one method comprises dissolving titanium tetrachloride and vanadium pentoxide ($V_2O_5$) in concentrated hydrochloric acid, neutralizing the acid solution with ammonia to form a precipitate, washing the resulting precipitate with water to remove ammonium chloride, followed by drying and calcination at a temperature of 450°C. to 600°C. The catalyst thus prepared generally contains vanadium oxide and titanium oxide in forms of a mixture and/or complex thereof. A part of said titanium oxide is in a crystalline form of rutile and the remainder is in the anatase crystalline form. The proportion of rutile and anatase varies depending upon the conditions under which the catalyst has been prepared. For example, the neutralization of the acid solution at a temperature below 40°C. results in a higher rutile content. Furthermore, the addition of a small amount of rutile type titanium oxide to the acid solution to be neutralized also results in an increased rutile content. Similarly, the calcination of the precipitate in an atmosphere which is poor in oxygen, preferably in an atmosphere in which the molecular oxygen content is 0% to about 10%, also results in an increased rutile content. It is essential for obtaining a high yield of acetic acid with good reproducibility that more than 50% of the titanium oxide in the catalyst is in the form of rutile. If major amount of titanium oxide in the catalyst is in the anatase form, high yields of acetic acid cannot be obtained.

In the present invention, the content of rutile in the catalyst is measured by the X-ray powder diffraction method, i.e., the X-ray (Cu, K$\alpha$ ray) diffraction of the pulverized catalyst and calculated by the following equation, the diffraction at $2\theta=25.4°$, referring to anatase: $2\theta=27.5°$ referring to rutile, and $2\theta=26.2°$ referring to vanadium.

It should be understood that it may be necessary to calcine samples at a temperature of 450°C. to 500°C. before taking the measurement of the rutile content in order to ascertain the exact rutile content because another diffraction peak is observed in the vicinity of $2\theta=27.5°$ when a part of vanadium pentoxide in the catalyst exists in a reduced form of vanadium tetroxide ($V_2O_4$).

The coprecipitation method for the preparation of the catalyst to be used in the process of the present invention is most preferred; however, other methods may also be employed. For example, the catalyst may be prepared by heating a mixture of vanadium pentoxide and titanium nitrate under appropriate conditions to decompose the titanium nitrate to titanium oxide.

In the catalyst to be used in the present invention, the atomic ratio of vanadium to titanium is generally about 1:10 to 10:1, and is preferably 1:0.3 to 1:3.

The catalyst may be used with or without a carrier and/or promoter, and in any form which is suitable for fluidized, moving or fixed bed operation. The shape and size of the catalyst may be varied quite widely. It is, however, preferred to use a fixed bed catalyst of columnar shaped particles whose average diameter and length are in the range of 2–7 millimeters.

The oxidation of butenes to acetic acid may be carried out by passing butene and molecular oxygen over the catalyst, preferably in the presence of steam. In the starting gas mixture to be fed onto the catalyst, the volume ratio of butene to oxygen is about 1:3 or less, preferably 1:8 to 1:20. The oxygen is most preferably supplied as air. The explosive limit of butene in air is 1.7% by volume, and therefore it is advisable from the viewpoint of safety to use the reaction conditions under which concentration of butene in air does not exceed 1.7% by volume. When steam is optionally present in the reaction mixture, the volume ratio of steam to air is 0.1:1 to 0.7:1, preferably 0.2:1 to 0.5:1. Increasing the proportion of steam may increase the yield of acetic acid, but it decreases the concentration of acetic acid in the crude aqueous acetic acid solution obtained, and is not preferable from the viewpoint of economical recovery of acetic acid. Decreasing the proportion of steam, on the other hand, decreases the yield of acetic acid because it increases the complete combustion of butenes.

The butenes suitable for the gas phase oxidation are butene-1, butene-2 and isobutene. Saturated butenes may be present in the butene feedstock without affecting the oxidation reaction, but the reactivity of butanes is low. Butene-containing hydrocarbon mixtures which are generally called the butene-butane fraction or BB-fraction may be used. As the content of isobutene and saturated hydrocarbons in the butene-butane fraction is smaller, the yield of acetic acid becomes higher.

The space velocity of the reaction gas in the oxidation is 1000 hr$^{-1}$ to 4000 hr$^{-1}$, preferably 2000 hr$^{-1}$ to 3000 hr$^{-1}$ (i.e., 2000 volume/catalyst volume·hour to 3000 volume/catalyst volume·hour), calculated by volume under normal condition.

The temperature of the oxidation reaction is maintained in the range of about 200°C. to 400°C., preferably 230°C. to 330°C. The oxidation may be carried out under atmospheric pressure, or reduced or elevated pressures. It is preferred to carry out the oxidation under a pressure of 3 atmospheres or below.

The gaseous reaction product after the oxidation generally contains not only acetic acid, hydrocarbons, oxygen, steam, maleic acid, acetone, lower aldehydes, formic acid and the like, but also carbon dioxide and carbon monoxide, the carbon oxides being combustion products. If the gaseous reaction product is cooled to condense acetic acid, a crude aqueous acetic acid solution with an acetic acid concentration of about 10% by weight may be obtained. The acetic acid contained in the reaction gas may also be recovered by contacting the reaction gas with water to absorb the acetic acid in water. Concentration and recovery of acetic acid from the dilute crude aqueous solution may be performed by solvent extraction and subsequent distillation, or by other conventional techniques.

The following examples are presented to further illustrate this invention.

EXAMPLE 1

30 parts by weight of vanadium pentoxide and 45 parts by weight of titanium tetrachloride were dissolved in 200 parts by weight of concentrated hydrochloric acid placed in a stirred vessel. The acid solution was neutralized with concentrated ammonia solution to a pH 7.0. As the neutralization was exothermic, it was carried out while maintaining the temperature of the solution below 30°C. by cooling in an ice bath. During the neutralization, a dark brown precipitate was formed. The precipitate was separated from the mother liquid, thoroughly washed with water, separated from water by centrifuging, and then calcined in an electric furnace at 520°C. while passing nitrogen through the furnace. Powders thus obtained were molded under pressure into columnar tablets of 3 millimeters in diameter and 3 millimeters in height. The catalyst thus prepared was found to be composed substantially of vanadium pentoxide and titanium oxide, and the rutile content was 73 percent.

Five cubic centimeters of the catalyst was charged into a stainless steel reaction tube of 10 millimeters inside diameter (I.D.), and the reaction tube was fixed in an oil bath of 250°C. Into the reaction tube were fed air, steam and butene-1 at flow rates of 9 liters/hour, 4 liters/hour and 0.2 liter/hour, respectively. The analysis of the reaction products revealed that acetic acid had been formed in a yield of 43.5%. The yield of acetic acid was calculated in accordance with the following equations.

$$\text{Yield of acetic acid (\%)} = \frac{(\text{molar amount of acetic acid}) \times (0.5)}{(\text{molar amount of butene supplied})} \times 100$$

$$C_4H_8 + 2 O_2 \rightarrow 2 CH_3COOH$$

EXAMPLE 2

1.8 liters of a catalyst (in which rutile content was 73%) prepared in the same manner as in Example 1 were packed in a reaction tube of 22 millimeters I.D. and 5 meters in length, and oil heated at 245°C. was circulated outside the tube. 72 liters/hour of BB-fraction (which contains $C_3$-hydrocarbons 0.6%, n-butane 11.5%, isobutane 2.5%, 1-butene 25.5%, 2-butene 14.0%, isobutene 45.1% and butadiene 0.7% by volume), 2970 liters/hour of air and 1420 liters/hour of steam were passed through the reaction tube. The conversion of the BB-fraction was 84%, and the yield of acetic acid was 34.2%.

EXAMPLES 3 AND 4, AND COMPARATIVE EXAMPLES A, B AND C

Catalysts having various rutile contents were prepared in a manner similar to Example 1 except that the temperature in the neutralization step was varied. Using these catalysts, the oxidation of the BB-fraction in Example 2 was repeated.

The results thus obtained are given in the following table, together with the result obtained in Example 2.

Table

| Example | Rutile Content % | Yield of Acetic acid % |
|---|---|---|
| 2 | 73 | 34.2 |
| 3 | 92 | 34.1 |
| 4 | 61 | 34.0 |
| Comparative | | |
| A | 45 | 27.0 |
| B | 20 | 24.5 |
| C | 3 | 22.1 |

From the foregoing data, it can be noted that when the proportion of titanium oxide in the rutile form was above 50%, the yield of acetic acid was about 34%, whereas when the proportion of rutile was less than 50%, the yield of acetic acid was only 22.1 to 27.0%.

What is claimed is:

1. In the process for the production of acetic acid by gas phase oxidation of butenes with molecular oxygen at elevated temperatures characterized by passing the butene and molecular oxygen at elevated temperatures over an effective amount of a catalyst comprising vanadium oxide and titanium oxide, the improvement which comprises employing a catalyst wherein the atomic ratio of vanadium to titanium is 10:1 to 1:10 and more than 50% of the titanium oxide is in the rutile crystalline form.

2. A process according to claim 1, wherein the oxidation is carried out at a temperature in the range of about 200°C. to 400°C.

3. A process according to claim 1, wherein the oxidation is carried out in the presence of steam.

4. A process according to claim 1, wherein the volume ratio of butene to oxygen is 1:3 or less.

5. A process according to claim 1, wherein the molecular oxygen is supplied as air.

6. A process according to claim 1, wherein the oxidation is carried out by using as the starting gas mixture a mixture containing butene, air and steam.

7. A process according to claim 6, wherein the volume ratio of steam to air is 0.1:1 to 0.7:1.

8. A process according to claim 1 wherein the catalyst is prepared by dissolving vanadium pentoxide and titanium tetrachloride in concentrated hydrochloric acid, neutralizing the acid solution at a temperature below 40°C. and calcining the resulting precipitate at a temperature in the range of about 450°C. to 600°C. in an atmosphere which is poor in oxygen.

9. A process for the production of acetic acid by gas phase oxidation of butenes with molecular oxygen at elevated temperatures which is characterized by passing a butene-butane fraction, air and steam over a catalytically effective amount of a solid catalyst comprising the vanadium oxide and titanium oxide, more than 50% of said titanium oxide being in the rutile crystalline form.

10. In the process for the production of acetic acid by gas phase oxidation of butenes with molecular oxygen at elevated temperatures characterized by passing the butene and molecular oxygen at elevated temperatures over an effective amount of a catalyst comprising vanadium oxide and titanium oxide, the improvement which comprises employing a catalyst consisting of vanadium oxide and titanium oxide wherein the atomic ratio of vanadium to titanium is 10:1 to 1:10 and more than 50% of the titanium oxide is in the rutile crystalline form.

11. The process of claim 10 wherein the catalyst contains an inert carrier.

* * * * *